United States Patent [19]

Korekawa et al.

[11] 4,070,957
[45] Jan. 31, 1978

[54] ICE CREAM MACHINE

[75] Inventors: Takashi Korekawa, Osaka; Nobuo Kato, Ikeda; Mikio Yamaoka, Takatsuki, all of Japan

[73] Assignee: Matsushita Electric Industrial Co., Ltd., Osaka, Japan

[21] Appl. No.: 606,952

[22] Filed: Aug. 22, 1975

Related U.S. Application Data

[63] Continuation of Ser. No. 425,795, Dec. 18, 1973, abandoned.

[30] Foreign Application Priority Data

| Dec. 20, 1972 | Japan | 47-147172[U] |
| Nov. 28, 1973 | Japan | 48-138219[U] |
| Nov. 28, 1973 | Japan | 48-134759 |
| Nov. 28, 1973 | Japan | 48-134760 |
| Nov. 28, 1973 | Japan | 48-134761 |

[51] Int. Cl.² .......... A23C 3/04; B01F 7/16; A23G 9/00
[52] U.S. Cl. .......... 99/455; 62/342; 366/149; 366/279
[58] Field of Search ....... 259/108, DIG. 32–DIG. 34; 62/342; 165/122, 80; 99/455, 466

[56] References Cited

U.S. PATENT DOCUMENTS

| 2,252,043 | 8/1941 | Sissel | 259/108 |
| 2,506,596 | 5/1950 | Howard | 165/80 |
| 2,541,814 | 2/1951 | Gaddini | 259/108 |

Primary Examiner—Leonard D. Christian
Assistant Examiner—Robert Pous
Attorney, Agent, or Firm—Stevens, Davis, Miller & Mosher

[57] ABSTRACT

Machine adapted to be incorporated in a refrigeration chamber of a refrigerator to make ice cream, comprising means for containing an ice cream mix in an agitation vessel and agitating the same, and means for causing an air layer on the outer surface of the agitation vessel to move. The provision of the air layer moving means is effective to promote heat exchange between the outer surface of the agitation vessel and the cold air in the refrigeration chamber by forcedly moving the air layer which might otherwise interfere with the exchange of heat between the outer surface of the agitation vessel and the cold air in the refrigeration chamber.

1 Claim, 6 Drawing Figures

ICE CREAM MACHINE

This is a continuation of application Ser. No. 425,795 filed Dec. 18, 1973, and now abandoned.

BACKGROUND OF THE INVENTION

This invention relates to ice cream machines, and more particularly it is concerned with an ice cream machine adapted to be incorporated in a refrigerator for making ice cream by utilizing a low temperature atmosphere in the refrigerator.

Generally, when ice cream is made by utilizing the low temperature in a refrigerator, it has hitherto been customary to place an ice cream freezer in the refrigeration chamber of the refrigerator and an ice cream mix in the ice cream freezer, the mix cooling while being agitated. In a refrigerator of the so-called direct cooling system in which the refrigeration chamber is formed by metallic plates integral with the evaporator, the agitation vessel for the ice cream mix is brought into contact with the metallic plates to cool the mix. This system permits ice cream to be made relatively quickly because thermal exchange is effected by heat conduction with a relatively high degree of efficiency. On the other hand, a refrigerator of the type in which cold air produced by the evaporator is forcedly circulated through the refrigeration chamber by a fan to effect heat exchange by heat transfer is very low in heat exchange efficiency because the cooling medium is air. It thus takes a refrigerator of this type seven to eight times as long to make ice cream as a refrigerator employing a direct cooling system, so that the former has not been suitable for practical use. An added disadvantage of the former is that the low rate of cooling results in the ice cream made thereby being gross in the crystals of ice and rough in texture.

SUMMARY OF THE INVENTION

An object of this invention is to provide an ice cream machine capable of making ice cream in a short time interval which is adapted to be incorporated in a refrigeration chamber of the type in which refrigeration is effected not by absorption of heat through heat transfer surfaces but by supplying cold air into the refrigeration chamber.

Another object of the invention is to provide an ice cream machine comprising means for forcedly causing an air layer to move along the outer surface of the agitation vessel for containing therein an ice cream mix for agitation, thereby promoting the effect of heat transfer.

Another object of the invention is to provide an ice cream machine which is effective to induce cold air in the low temperature atmosphere in the vicinity of the agitation vessel to move toward the agitation vessel when the air layer on the outer surface of the agitation vessel is moved, thereby increasing the degree of efficiency with which heat is absorbed from the agitation vessel.

Still another object of the invention is to provide an ice cream machine which permits power required for agitating an ice cream mix and power required for moving the air layer in the vicinity of the agitation chamber to be obtained from a single power source, thereby obtaining an overall compact size and simple construction in an ice cream machine.

According to the invention, there is provided an ice cream machine comprising an agitation vessel for containing an ice cream mix therein, agitation means for agitating the ice cream mix in the agitation vessel, and means for moving an air layer disposed adjacent the outer surface of the agitation vessel.

DESCRIPTION OF A PREFERRED EMBODIMENT

The invention which obviates the aforementioned disadvantages of the prior art will now be described with reference to a preferred embodiment thereof shown in the accompanying drawings.

Figure 1:
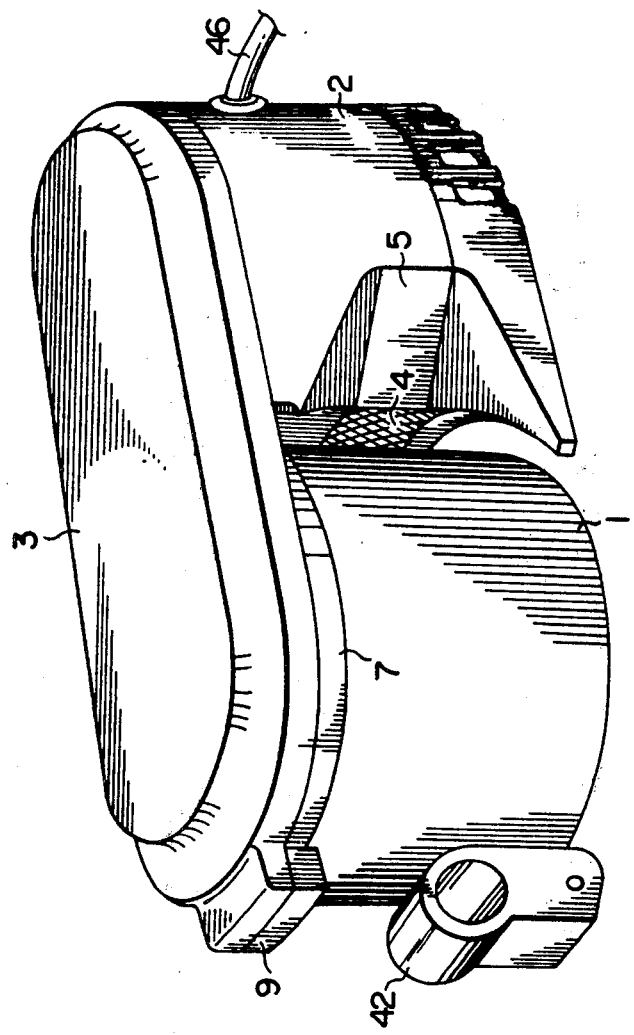
FIG. 1 is a perspective view of the ice cream machine comprising one embodiment of the invention.

In FIG. 1, 1 designates an agitation vessel for containing therein an ice cream mix for agitation, 2 a main body casing housing therein an electric motor for supplying power for agitating the ice cream mix in the agitation vessel 1 and a fan for blowing cold air against the outer surface of the agitation vessel 1, and 3 is a lid for providing a cover for a gear housing formed integrally with the casing 2. A reducing gear train for reducing the motor speed is disposed beneath the lid 3.

Figure 2:
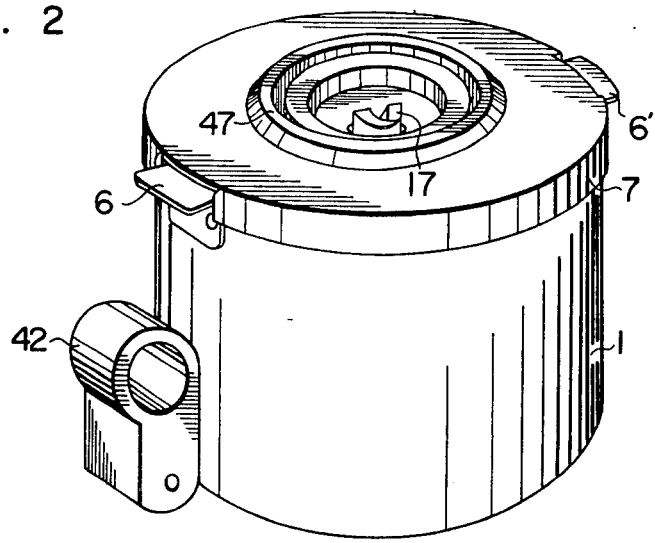
FIG. 2 is a perspective view of the agitation vessel.

In FIG. 2, the agitation vessel 1 has a lid 7 and an agitation blade 10 (shown in FIG. 3 in detail) rotatably supported by the lid 7, and detachably attached to the main body casing. The agitation vessel 1 is attached to and detached from the main body casing 2 by bringing lugs 6, 6' into and out of engagement with engaging portions 9, 9' formed in the casing 2.

Figure 3:
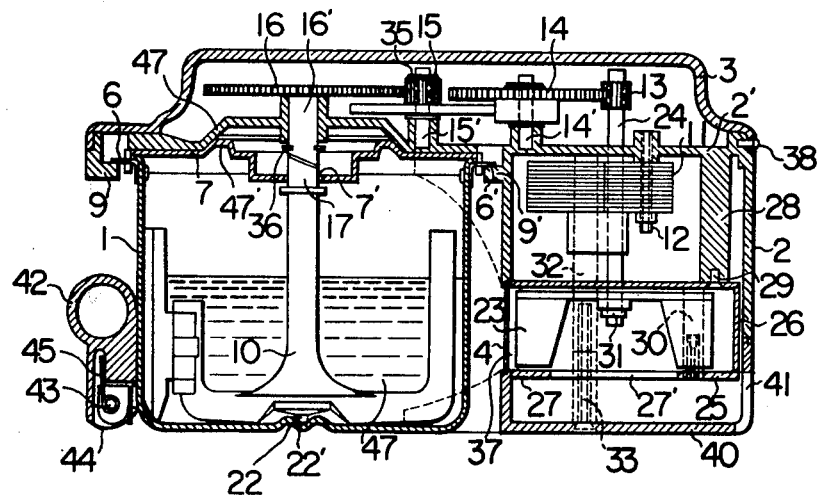
FIG. 3 is a sectional view of the ice cream machine shown in FIG. 1.

In FIG. 3, the motor 11 is affixed to a frame 2' of the main body casing 2 by a screw 12. A gear 13 is affixed to one end of a rotor shaft 24 while a fan 23 for supplying cold air is affixed to the other end thereof by a screw. 31 is a lock nut. Rotation of gear 13 is transmitted to a gear 16 through gears 14 and 15 rotatably supported by shafts 14' and 15' respectively inserted in the frame 2' of the casing. 34, 35 are stop rings. Gear 16 is rotatably supported by the frame 2' through a shaft and prevented by stop ring 36 from being dislodged.

The agitation blade 10 disposed in the agitation vessel 1 is supported by a rotary shaft supported at one end by a recess 22' formed in the bottom of the agitation vessel 1 and at the other end by a bore 7' formed in the lid 7. Gear 16 is supported by a shaft having an end portion 16' similar in shape to an end portion 17 of the agitation blade 10, the two end portions 16' and 17 being coupled to and maintained in engagement with each other so that rotation of gear 16 is transmitted to the agitation blade 10. When the two end portions 16' and 17 are brought into engagement with each other, an annular protuberance 47' formed in the lid 7 is snugly received in a recess 47 formed in the frame 2', so that centering of the end portions 17 and 16' can be automatically effected.

The numeral 26 designates a fan case constituting a vortex chamnber for the fan 23 and affixed to a boss 28 of the frame 2' by a screw 29. 27 is a cover for the fan case 26 and formed in its central portion with an opening 27' and affixed to the fan case 26 by a lock nut. 40 is a back cover affixed to the main body casing 2 by a screw 33 and formed with a cold air suction port 41. 37 is a cold air outlet port for supplying therethrough to the agitation vessel a stream of cold air produced by the fan 23. The cold air outlet port 37 is provided with a safety net 4 attached thereto. The lid 3 is affixed to the frame 2' by screws 38, 39.

Figure 6:
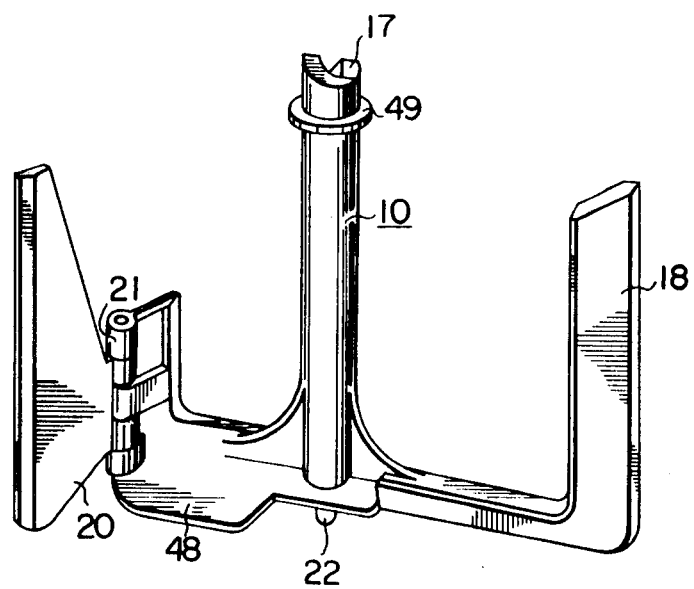
FIG. 6 is a perspective view of the agitation blade.

In FIG. 6, 20 designates a scraper hingedly connected to a lower portion 21 of the agitation blade 10 and adapted to scrape off the minuscule crystals of ice from the inner wall surface of the agitation vessel 1 and move the ice cream mix toward the center of the vessel each time the agitation blade 10 rotates. The agitation blade 10 is formed therein with agitators 18, 48 of the shape and dimensions which are selected to achieve uniform agitation of the ice cream mix. 49 is a flange for keeping the agitation blade 10 from moving upwardly.

Referring to FIG. 3 again, 42 is a knob mounted on the agitation vessel 1 through a shaft 43 for angular rotation and includes a bottom surface 44 which is shaped such that the agitation vessel is lifted from the wall surface as the knob 42 is turned. In case the ice cream machine according to the invention is incorporated in a refrigerator of the direct cooling system, the knob 42 is used to separate the agitation vessel 1 from the inner wall surface of the refrigeration chamber of the refrigerator when they are stuck together by freezing. If released, the knob 42 is restored to its original position by the biasing force of a spring 45.

Figure 4:
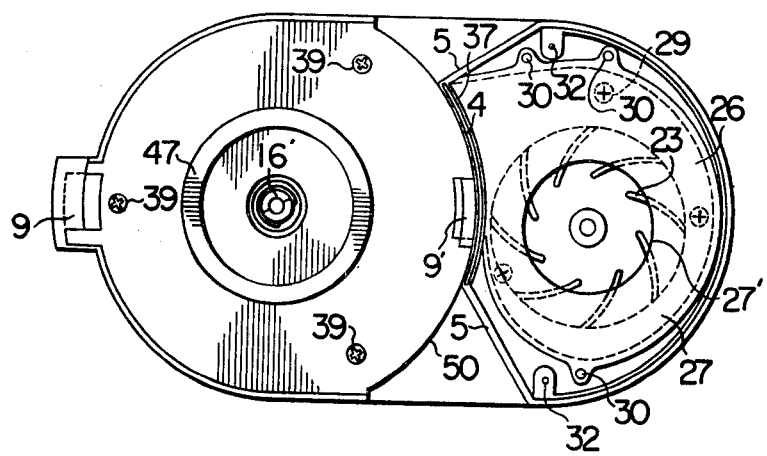
FIG. 4 is a bottom plan view of the ice cream machine shown in FIG. 1, with the agitation vessel and back cover being removed therefrom.
Figure 5:
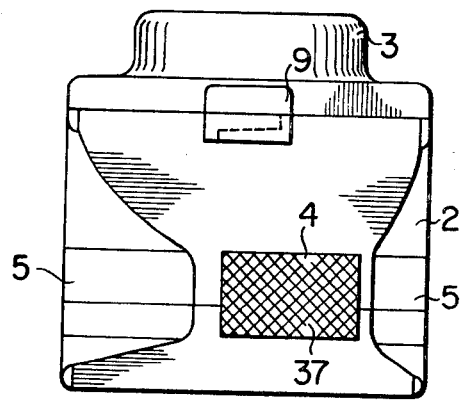
FIG. 5 is a side view of the ice cream machine shown in FIG. 4.

FIG. 4 shows the ice cream machine as seen from the bottom, with the agitation vessel 1 and the back cover 40 removed from the main body casing 2. The cold air outlet port 37 is unsymmetrical with respect to the center line of the main body casing 2. This is effective to permit a stream of cold air produced by the fan 23 to flow evenly along the outer surface of the agitation vessel 1 by displacing the cold air outlet port 37 in a direction opposite to the direction of rotation of the fan 23 because the stream of cold air discharged has a momentum which is biased toward the direction of rotation of the fan 23. 50 designates a guide wall for guiding the stream of cold air discharged through the port 37 and causing the same to flow in two substreams moving to the right and left along the outer surface of the agitation vessel 1. The provision of the guide wall 50 is effective to greatly increase the area on the outer surface of the agitation vessel 1 on which the air layer moves.

Referring to FIG. 1 and FIG. 4 again, the guide wall 50 has at each of opposite ends a cutout 5 through which the cold air in the surrounding low temperature atmosphere is induced to move toward the agitation vessel 1 by virtue of the stream of cold air discharged through the cold air outlet port 37, so as to increase the degree of efficiency with which heat exchange is effected. More specifically, the stream of cold air discharged through the cold air outlet port 37 and blown against the surface of the agitation vessel 1 is divided into two substreams moving to right and left after effecting heat exchange with the peripheral surface of the vessel 1. The two substreams further flow along the peripheral surface of the agitation vessel, so that the temperature of these substreams of air becomes higher than the cold air in the refrigeration chamber during the process of heat exchange. Thus, by inducing the cold air in the refrigeration chamber to move toward the agitation vessel 1 and join the substreams of air discharged through the outlet port for effecting heat exchange, it is possible to lower the temperature of the cold air streams flowing along the outer surface of the agitation vessel 1.

In operation, an ice cream mix 57 of a constant volume and at normal temperature is placed in the agitation vessel 1 and the lower end 22 of the shaft supporting the agitation blade 10 is fitted in the recess 22' in the agitation vessel 1. Then the lid 7 is placed on the vessel 1.

The agitation vessel 1 ready for use as aforementioned is inserted into the frame 2' of the main body casing 2 and the upper end portion 17 of the agitation blade 10 is coupled to the end portion 16' of the shaft supporting gear 16. Then the agitation vessel 1 is turned counter-clockwise relative to the casing 2 so as to bring the lugs 6, 6' into engagement with the respective engaging portions 9, 9'. Thus the agitation vessel 1 is connected to the main body casing 2. Thereafter, a power source cord 46 is connected a power source to supply power from the power source to the motor 11 which begins to rotate. Rotation of the motor 11 is transmitted to the agitation blade 10 so that the mix in the agitation vessel 1 is agitated.

The agitation vessel cooling function of the ice cream machine according to the invention will be described. Rotation of the motor 11 results in the fan 23 rotating at the same time, with the result that the cold air in the refrigeration chamber is introduced into the vortex chamber 26 through the cold air suction port 41 and the opening 27' formed in the cover 27 and cold air is discharged through the cold air outlet port 37. The stream of cold air discharged through the outlet port 37 is blown against the outer surface of the agitation vessel 1 and divided into two substreams which move to right and left along the outer surface of the agitation vessel 1.

An air layer substantially equal in temperature to the outer periphery of the agitation vessel is formed on the border of the cold air zone in the refrigeration chamber and disposed along the outer surface of the agitation vessel which contains therein the mix of substantially normal temperature. This border air layer keeps heat exchange from being effected between the outer surface of the vessel 1 and the cold air in the refrigeration chamber. However, by blowing the stream of cold air against the outer surface of the vessel 1, this air layer is removed from the outer surface of the vessel 1 and cold air substantially equal in temperature to the cold air in the refrigeration chamber comes into contact with the outer surface of the vessel 1. Thus, by blowing a stream of cold air against the outer surface of the agitation vessel 1, it is possible to maintain the difference between the temperature of the outer surface of the agitation vessel and the temperature of air brought into contact with the outer surface of the vessel 1 at a high level.

As a result, the difference between the temperature of cold air in the refrigeration chamber and the temperature of the outer surface of the agitation vessel 1 becomes great, and the degree with which heat exchange is effected between them is markedly increased, thereby reducing the time interval required for making ice cream.

Experiments were carried out with a standard refrigerator (effective volume: 170 liters) by using the ice cream machine according to the invention. The results show that freezing of an ice cream mix of 400 cubic centimeters was completed in about 70 minutes which is about 1/7 to ⅛ the time required for making ice cream by a method of the prior art at the same rate of power consumption for the freezer motor without the benefit of blowing of cold air against the agitation vessel. The results also show that the ice cream produced by using the machine according to the invention is more delicious than that made by a conventional cream freezer because the crystals of ice are smaller and the texture is finer in the former than in the latter.

In the embodiment shown and described above, the air layer disposed on the border of the cold air zone in the refrigeration chamber and adjacent the outer surface of the agitation vessel has been described to be removed therefrom by blowing cold air against the agitation vessel. It is to be understood, however, that the end can be attained by causing to flow along the outer surface of the agitation vessel a stream of air which is produced when the cold air in the refrigeration chamber is induced to mix with the stream of air produced by the fan.

We claim:

1. An ice cream machine for use in a cold air environment comprising a stationary agitation vessel of a substantially cylindrical shape for containing an ice cream mix therein, rotatable agitation means for agitating the ice cream mix in the agitation vessel, blower means provided with a cold air inlet port and a cold air outlet port, said outlet port disposed in the vicinity of the agitation vessel, said blower means receiving cold air from said cold air environment through said inlet and blowing said cold air through said outlet port perpendicularly against the peripheral wall of the agitation vessel, and guide wall means having opposite side edges located adjacent said agitation vessel for guiding a stream of cold air discharged through the outlet port of the blower means to move along the outer peripheral surface of the agitation vessel, said guide wall means having a substantially circularly arcuate shape so as to divide substantially evenly the stream of cold air discharge through the outlet port of the blower means into two substreams of cold air, said guide wall means having cutouts at said opposite side edges thereof for inducing cold air remote from the agitation vessel to move toward the agitation vessel.

* * * * *